United States Patent [19]

Zabrocki et al.

[11] Patent Number: 4,581,409

[45] Date of Patent: Apr. 8, 1986

[54] ABS-MOULDING COMPOSITIONS WITH IMPROVED FIRE REPELLENCY

[75] Inventors: Karl Zabrocki, Buettgen; Friedemann Müller, Neuss; Joachim Döring, Cologne, all of Fed. Rep. of Germany

[73] Assignee: Bayer Aktiengesellschaft, Leverkusen, Fed. Rep. of Germany

[21] Appl. No.: 661,935

[22] Filed: Oct. 17, 1984

[30] Foreign Application Priority Data

Oct. 29, 1983 [DE] Fed. Rep. of Germany ....... 3339353

[51] Int. Cl.[4] ...................... C08L 51/04; C08L 55/02; C08F 230/08
[52] U.S. Cl. ........................................ 525/72; 526/279
[58] Field of Search ..................... 525/72, 86; 526/279

[56] References Cited

U.S. PATENT DOCUMENTS

| 3,271,355 | 9/1966 | Vanderbilt et al. | 260/41.5 |
| 4,043,953 | 8/1977 | Chang et al. | 526/279 |
| 4,228,051 | 10/1980 | Sakano et al. | 525/72 |

FOREIGN PATENT DOCUMENTS 1183585  3/1970  United Kingdom ............... 526/279

Primary Examiner—Wilbert J. Briggs, Sr.
Attorney, Agent, or Firm—Connolly and Hutz

[57] ABSTRACT

The invention relates to ABS moulding compositions based on selected copolymers and, optionally graft polymers of olefinically unsaturated monomers which are suitable for the preparation of ABS and silicon derivatives which are capable of copolymerization, the flame resistant properties of these moulding compositions being improved in comparison with conventional ABS material.

6 Claims, No Drawings

ABS-MOULDING COMPOSITIONS WITH IMPROVED FIRE REPELLENCY

The invention relates to ABS moulding compositions based on selected copolymers and optionally, graft polymers of olefinically unsaturated monomers which are suitable for the preparation of ABS and silicon derivatives which are capable of copolymerisation, the flame resistant properties of these moulding compositions being improved in comparison with conventional ABS materials.

ABS moulding compositions are two-phase plastics of:

I. one or more thermoplastic copolymers of styrene and acrylonitrile, it being possible for all or some of the styrene to be replaced by α-methylstyrene, nuclear-substituted styrenes, methyl methacrylates, maleic anhydride or optionally substituted maleimide. This copolymer also designated as SAN resin or matrix resin, forms the external continuous phase;

II. at least one graft polymer which has been prepared by a grafting polymerization of one or more of the monomers mentioned in I. onto a rubber-like polymer ("graft base"). This graft polymer, also called the "elastomer phase" or "graft rubber", forms the disperse, discontinuous phase.

ABS moulding compositions are widely used for the production of moulded articles for example parts for the interior of automobiles, household articles and housings. A disadvantage is their combustibility, which restricts their use for components exposed to heat, for example housings for radio and television sets. Inorganic oxides, for example antimony oxide, and halogen-containing additives, for example octabromodiphenyl diphenyl ether, can be added to increase the flame resistance of ABS moulding compositions. However, these additives are only effective in amounts of 5 to 30% by weight, based on the moulding compositions, and severely impair the mechanical properties of the compositions.

It has been found that the combustibility of ABS polymers can be substantially reduced by copolymerisation of at least one monomer which carries silane groups.

The present invention relates to ABS moulding compositions which essentially consist of:

I. 90-30% by weight (based on the sum of I+II) of one or more thermoplastic copolymers of
  I(a) 65-80% by weight (based on the sum of Ia+Ib+Ic) of styrene, α-methylstyrene, nuclear-alkylated styrene, vinyltoluene, p-methylstyrene, halogenostyrenes, maleic anhydride, optionally substituted maleimide, methyl methacrylate or mixtures thereof,
  I(b) 35-20% by weight (based on the sum of Ia+Ib+Ic) of acrylonitrile and/or methacrylonitrile, and
  I(c) 0.01 to 1.0% by weight (based on the sum of Ia+Ib+Ic) of at least one copolymerisable silane compound; and
II. 10-70% by weight (based on the sum of I+II) of one or more graft polymers obtainable by polymerisation of the monomers mentioned under Ia to Ie in the presence of at least one rubber. In graft polymer II one monomer taken from group Ia alone can be graft polymerized. In this case styrene is preferred. Also possible is a mixture of monomers from group Ia and Ib, preferably 90:50% by weight Ia and 50% by weight Ib. In this case a mixture of styrene and acrylonitrile is preferred. Lastly a combination of monomers Ia, Ib and Ic can be used in the amounts given under I.

Of the monomers Ia and Ib which form a main constituent, those with a polysubstituted double bond, for example α-ethylstyrene, maleimide or methacrylonitrile, can be used if moulding compositions with an increased heat distortion point are to be prepared. Styrene/acrylonitrile copolymers are more suitable for moulding compositions which are particularly easy to process and flow readily. A balanced ratio between the two material properties is achieved, for example, with combinations of styrene/acrylonitrile, p-methylstyrene/acrylonitrile and methyl methacrylate/styrene/acrylonitrile.

Combinations of styrene/acrylonitrile and α-methylstyrene/acrylonitrile are preferred.

The monomers Ic to be copolymerised according to the invention contain, on the one hand, carbon double bonds which are capable of copolymerisation and, on the other hand, a silane unit, which is preferably substituted. Suitable compounds have, for example, the structures I and II.

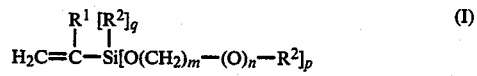

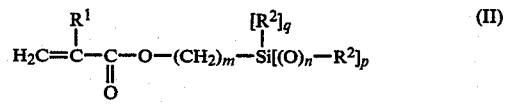

in which
m=1 to 3,
n=0 and 1,
p=1 to 3,
q=3-p,
R$^1$=H or CH$_3$ and
R$^2$=C$_1$-C$_4$-alkyl.

The compounds II have proved to have particularly advantageous copolymerisation properties here, γ-methacryloxypropyltrimethoxysilane being singled out in particular.

According to the invention, the properties in which the 3 monomers Ia, Ib and Ic are used are 65-80% by weight of Ia, 35-20% by weight of Ib and 0.05-1.0% by weight of Ic.

The preferred proportions are 60-75% by weight of Ia, 32-25% by weight of Ib and 0.1-0.4% by weight of Ic.

Smaller amounts of Ic have only an inadequate effect in respect of flameproofing, and larger amounts can lead to drastic looses of mechanical properties.

The graft polymers II can be prepared by polymerisation of monomers Ia to Ie in the presence of at least one rubber. Possible rubbers ("graft base") are all the materials customary for ABS, for example polybutadiene, butadiene/styrene copolymers; butadiene/acrylonitrile copolymers and polybutyl acrylate homopolymers and copolymers.

The monomers mentioned are polymerised in the presence of these graft bases and are thereby completely or partly grafted on. Graft polymers II which are prepared in the presence of monomer mixtures Ia+Ib or Ia+Ib+Ic in general achieve greater toughness properties and are therefore preferred.

The weight ratio of the polymerised monomers to the rubber solids content is as a rule 95:5 to 10:90, preferably 60:40 to 30:70. Graft polymers II contain 95 to 10% by weight of rubber and 5 to 90% by weight of grafted monomers, preferably 60 to 30% by weight of rubber and 40 to 70% by weight of grafted monomers.

All the customary polymerisation techniques, such as bulk polymerisation, solution polymerisation and emulsion polymerisation, can be used for the preparation of the resin polymers I and also of the graft polymers II. A more detailed description of the processes is to be found in [Ullmann's Encyclopaedia der Technischen Chemie] (Volume 19, pages 277–95; Verlag Chemie, 1080).

Bulk polymerisation and emulsion polymerisation are preferred here; in the preparation of emulsion graft polymers, rubber bases which are already in the form of aqueous latices are used as starting substances.

The resins I according to the invention are in general readily soluble in organic solvents and have average molecular weights of $6 \times 10^3$ to $10^6$, preferably $10^4$ to $2 \times 10^5$.

The graft polymers II are only partly soluble. They preferably have degrees of grafting G of 0.3 to 1,0, the degree of grafting being defined in DE-AS [German Published Specification] No. 2,420,358.

The resin polymers I can be mixed with the graft polymers II either in the "wet" state, that is to say as a solution, suspension or emulsion, or in the "dry" state, that is to say as a powder, as granules or as a melt, the latter case being followed by a thorough mixing customary for thermoplastics in kneaders, screw machines, roll mills or other machines customary for the processing of thermoplastics. The customary additives, such as stabilisers, lubricants, antistatics, fillers, pigments and the like, can be added before and/or after the mixing operation.

Further industrial processing of the finished ABS materials is preferably effected by the methods for processing thermoplastics, such as granulation, injection moulding, extrusion, calendering, pressing and blow moulding.

The A8S moulding compositions according to the invention are distinguished by a considerably improved flame repellency coupled with good mechanical properties and a good heat distortion point.

The following examples illustrate the invention.
The amounts given are parts by weight.

PREPARATION OF THE RESIN POLYMERS

A solution of 650 g of water and 21 g of potassium persulphate is added to a stirred mixture of 6,000 g of demineralised water and 8 g of a resin acid emulsifier, rendered alkaline with NaOH, after careful flushing with $N_2$ and heating up to 65° C. The monomer mixtures which can be seen from Table 1 are then added in several additions and a solution of 1,750 g of $H_2O$ and 192 g of resin acid which has been rendered alkaline is added over a metering time of 4 hours. After the end of the additions, the mixture is subsequently stirred at 65° C. for 4 hours.

TABLE 1

| | (weight data in g) | | | | | | | | | |
|---|---|---|---|---|---|---|---|---|---|---|
| | Addition 1 | | | | Addition 2 | | | | Total composition (%) | | |
| Resin | Styrene | Acrylo-nitrile | Silane | Metering time | Styrene | Acrylo-nitrile | t-Do-decylmer-captan | Metering time | Styrene | Acrylo-nitrile | Silane |
| A | 2504.6 | 974.4 | 21.0 | 3 hours | 2520.0 | 980.0 | 15.4 | 4 hours | 71.78 | 27.92 | 0.3 |
| B | 2499.7 | 972.3 | 28.0 | 3 hours | 2520.0 | 980.0 | 15.4 | 4 hours | 71.71 | 27.89 | 0.4 |
| C | — | — | — | — | 5040.0 | 1960.0 | 15.4 | 4 hours | 72.00 | 28.00 | — |

γ-Methacryloxypropyltrimethoxysilane was used as the silane.

PREPARATION OF THE GRAFT POLYMERS

A stirred mixture of 1,250 g (calculated as the solid) of a polybutadiene latex with an average particle diameter of 0.4 um, diluted with water to a solids content of 20%, is heated up to about 65° C., while flushing with $N_2$, a solution of 300 g of $H_2O$ and 12.5 g of potassium persulphate is added and 1,250 g of a monomer mixture according to Table 2 and a solution, which has been rendered alkaline, of 625 g of water and 71.25 g of resin acid are then metered in over 4 hours. After the end of the metering, the mixture is allowed to react at 65°–70° C. for a further 4 hours.

TABLE 2

| | (weight data in g) | | | | | | | | | |
|---|---|---|---|---|---|---|---|---|---|---|
| | Addition 1 | | | | Addition 2 | | | Composition of the graft polymer (%) | | | |
| Graft | Styrene | Acrylo-nitrile | Silane | Metering time | Styrene | Acrylo-nitrile | Metering time | Poly-butadiene | Styrene | Acrylo-nitrile | Silane |
| D | 447.25 | 174.0 | 3.75 | 3 hours | 450 | 175 | 4 hours | 50 | 35.89 | 13.96 | 0.15 |
| E | 446.50 | 173.50 | 5.00 | 3 hours | 450 | 175 | 4 hours | 50 | 35.86 | 13.94 | 0.20 |
| F | — | — | — | — | 900 | 350 | 4 hours | 50 | 36.00 | 14.00 | — |

γ-Methacryloxypropyltrimethoxysilane was used as the silane.
After addition of a stabiliser, the resins and graft polymers were precipitated separately by addition of salt, washed and dried.

PREPARATION AND TESTING OF THE ABS COMPOUNDS

The materials shown in Table 3 were mixed together with 2% by weight of ethylenediaminebissstearoylamide wax on an internal kneader and the mixture was injection moulded to test pieces, the burning speed of which was measured according to VDE 0860 HF. Table 3 summarises the examples, comparison experiments and test data.

TABLE 3

| | Materials, amounts used, test data | | |
|---|---|---|---|
| Experiment/Example | Resin phase | Graft polymer | Burning speed (mm/min) |
| Comparison experiment | | | |
| a | 60 resin C | 40 graft F | 43 |
| b | 80 resin C | 20 graft F | 44 |
| Example | | | |
| 1 | 60 resin A | 40 graft D | 38 |
| 2 | 60 resin A | 40 graft F | 36 |
| 3 | 60 resin B | 40 graft F | 33 |
| 4 | 60 resin B | 40 graft D | 37 |
| 5 | 80 resin B | 20 graft F | 29 |
| 6 | 80 resin A | 20 graft E | 36 |
| 7 | 80 resin A | 20 graft F | 37 |
| 8 | 80 resin B | 20 graft F | 27 |

We claim:
1. A moulding composition of
(I) 90 to 30% by weight (based on the sum of I+II) of one or more thermoplastic copolymers of
   I(a) 65 to 80% by weight (based on the sum of Ia+Ib+Ic) of styrene, α-methylstyrene, nuclear-alkylated styrene, vinyltoluene, p-methylstyrene, halogenostyrene, maleic anhydride, maleimide, methyl methacrylate or mixtures thereof,
   I(b) 35 to 20% by weight (based on the sum of Ia+Ib+Ic) of acrylonitrile and/or methacrylonitrile, and
   I(c) 0.01 to 1.0% by weight (based on the sum of Ia+Ib+Ic) of at least one copolymerisable silane compound; and
(II) 10 to 70% by weight (based on the sum of I+II) of one or more graft polymers obtained by polymerisation of one or more of the monomers mentioned under Ia to Ic in the presence of at least one rubber polymer.

2. A moulding composition according to claim 1, in which the combination Ia+Ib is a styrene/acrylonitrile or α-methylstyrene/acrylonitrile combination.

3. A moulding composition according to claim 1 or 2 in which the silane compound Ic corresponds to the general formula

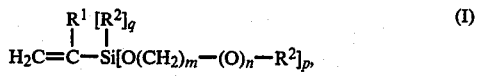

or

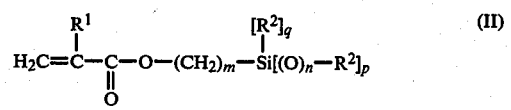

in which
m is 1,2 or 3,
n is 0 or 1,
p is 1,2 or 3,
q is 3-p,
$R^1$ denotes hydrogen or methyl and
$R^2$ denotes $C_1$–$C_4$-alkyl.

4. A moulding composition according to claim 3 in which the compound of formula (II) is γ-methacryloxypropyltrimethoxysilane.

5. A moulding composition according to claim 1 in which compounds Ia, Ib and Ic are present in amounts of 60 to 75% by weight of Ia, 32 to 25% by weight of Ib and 0.1 to 0.4% by weight of Ic, percentages by weight each being based on the sum of Ia+Ib+Ic.

6. A moulding composition as claimed in claim 1 wherein graft polymer II contains 95 to 10% by weight of rubber polymer and 5 to 90% by weight of graft polymerized monomers which in turn consist essentially of monomers Ia or a mixture of monomers Ia and Ib in a weight ratio of 90 to 50% by weight Ie and 10 to 50% by weight Ib or of a mixture of monomers Ia, Ib and Ic in the weight ratios given in I.